US012618652B2

(12) United States Patent
Schatzman

(10) Patent No.: US 12,618,652 B2
(45) Date of Patent: May 5, 2026

(54) ROCKET CAMERA SYSTEM AND METHOD WITH ROCKET AND CAMERA DISPENSER

(71) Applicant: Blue Origin Manufacturing, LLC, Huntsville, AL (US)

(72) Inventor: Edward Shawn Schatzman, Edgewood, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 138 days.

(21) Appl. No.: 18/529,857

(22) Filed: Dec. 5, 2023

(65) Prior Publication Data

US 2025/0180340 A1 Jun. 5, 2025

(51) Int. Cl.
| | |
|---|---|
| *F42B 15/08* | (2006.01) |
| *F42B 15/36* | (2006.01) |
| *H04N 23/698* | (2023.01) |

(52) U.S. Cl.
CPC .............. *F42B 15/08* (2013.01); *F42B 15/36* (2013.01); *H04N 23/698* (2023.01)

(58) Field of Classification Search
CPC .................................. B64G 1/002; B64G 1/66
See application file for complete search history.

(56) References Cited

U.S. PATENT DOCUMENTS

| | | | | | |
|---|---|---|---|---|---|
| 3,537,369 | A | * | 11/1970 | Estes .................... | G03B 15/006 396/7 |
| 10,214,303 | B1 | * | 2/2019 | Turner ..................... | B64G 1/14 |
| 11,014,670 | B2 | * | 5/2021 | Stephens, Jr. ............. | B64B 1/40 |

* cited by examiner

*Primary Examiner* — Arfan Y. Sinaki
(74) *Attorney, Agent, or Firm* — Summit Patents PC

(57) ABSTRACT

Systems and methods for photography of a spacecraft during space flight are provided. An autonomous deployable camera (ADC) is configured to capture images and video of a portion of a rocket, such as a crew capsule, as it flies in space with the Earth's horizon in the background and astronauts within the crew capsule visible and recognizable through windows of the crew capsule. The ADC, being reusable, is configured to land on the ground independent of landings or flight trajectories of the crew capsule or other parts of a rocket. The ADC includes a parachute to slow the descent of the ADC and tracking hardware to allow the ADC to be relatively easily recovered on the ground. After recovery, images are downloadable from the ADC.

20 Claims, 3 Drawing Sheets

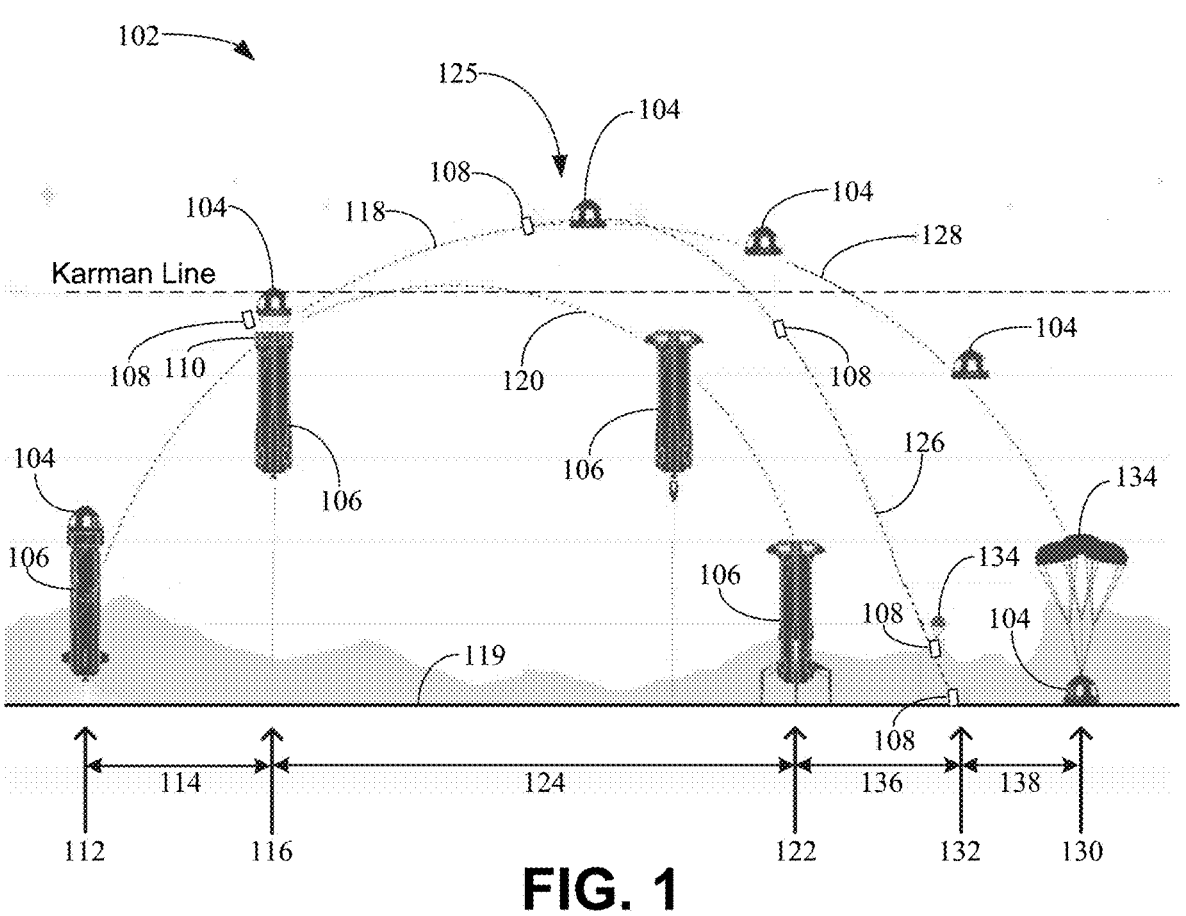
FIG. 1
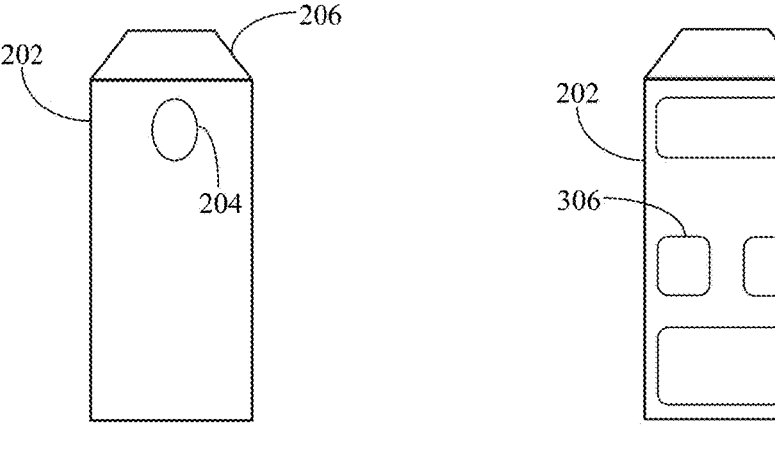
FIG. 2          FIG. 3

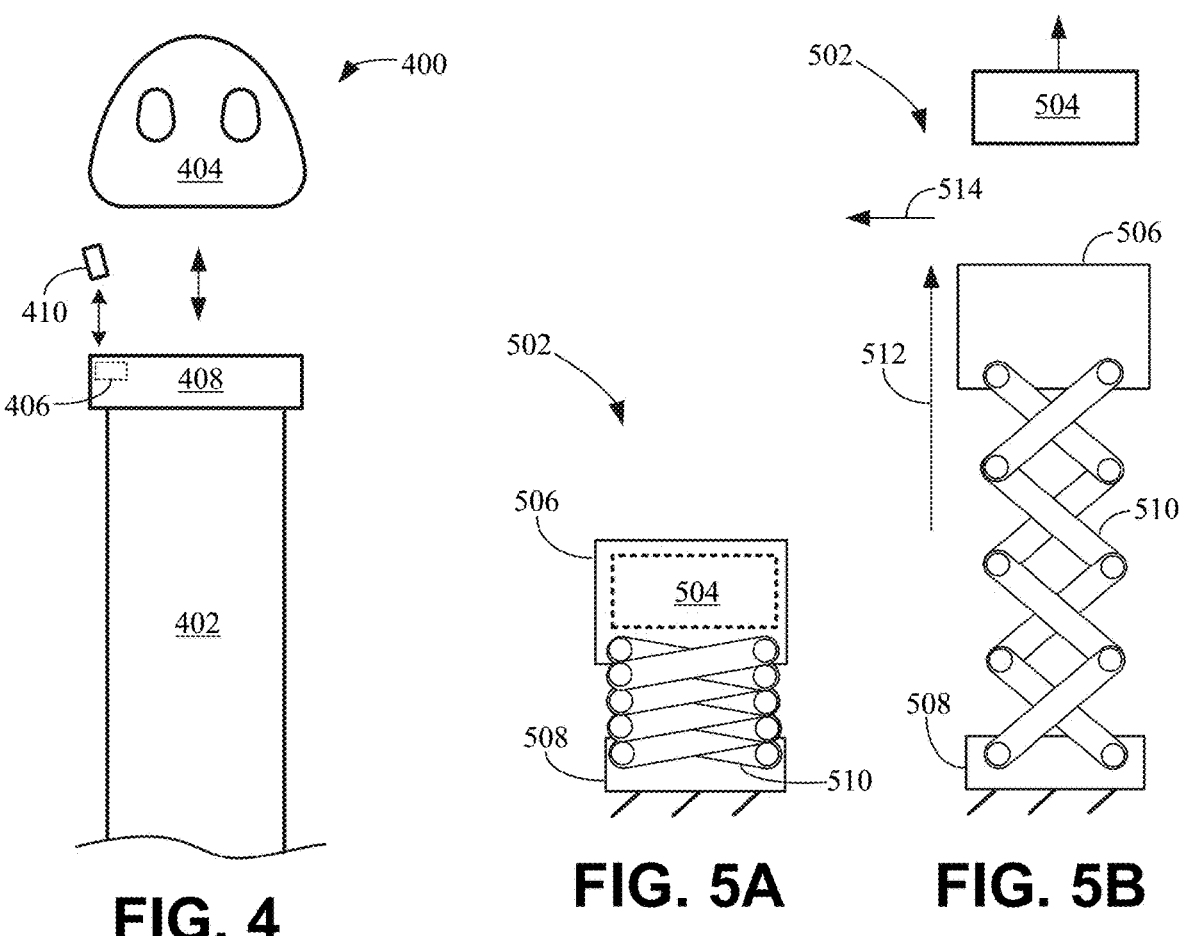
FIG. 4
FIG. 5A
FIG. 5B
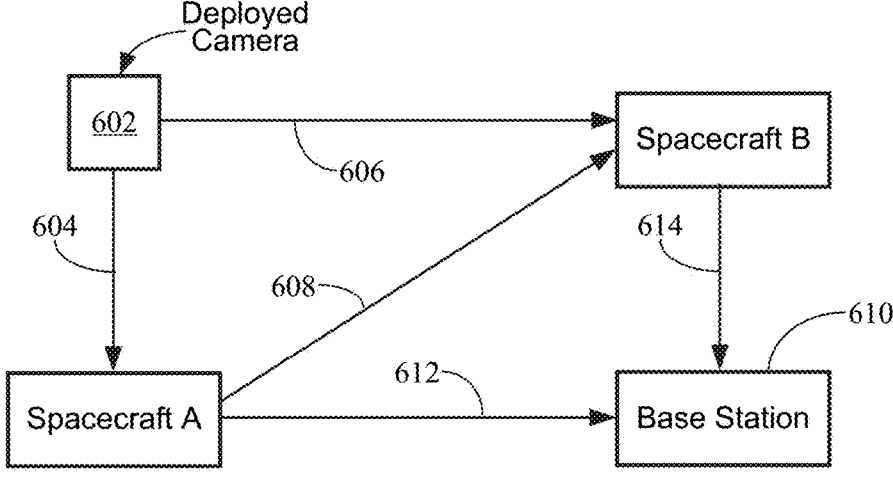
Deployed Camera
FIG. 6

700

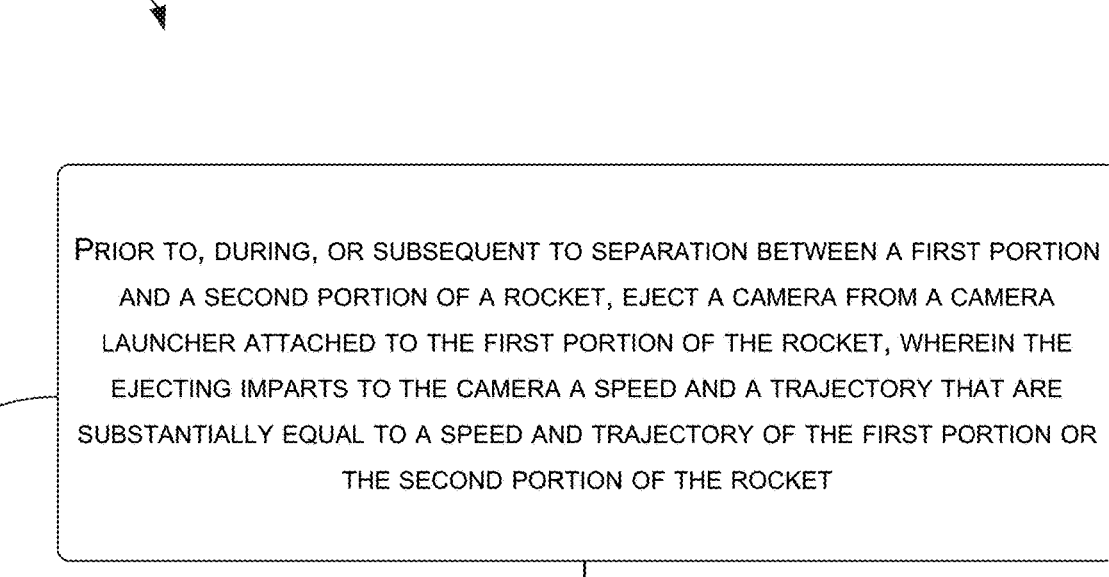

704

Prior to, during, or subsequent to separation between a first portion and a second portion of a rocket, eject a camera from a camera launcher attached to the first portion of the rocket, wherein the ejecting imparts to the camera a speed and a trajectory that are substantially equal to a speed and trajectory of the first portion or the second portion of the rocket

706

Use the camera to capture video or images of the first portion or the second portion of the rocket

FIG. 7

ROCKET CAMERA SYSTEM AND METHOD WITH ROCKET AND CAMERA DISPENSER

BACKGROUND

Photography of a spaceflight mission, during flight, is difficult for a number of reasons. For example, land-based cameras are far from the trajectory of a rocket, necessitating the use of large telephoto lenses to enable capture of images of a rocket launch and early flight. Such images will likely be at least somewhat distorted due to atmospheric refraction over relatively large optical distances. Moreover, as a rocket travels further into the upper atmosphere and beyond, land-based cameras, no matter the power of a telephoto lens, are not able to capture detailed images of the performance of the rocket system. Alternatively, cameras onboard the rocket may capture images from the perspective of various locations of the rocket. Such images, however, may have limited use in analyzing events such as stage or module separation and cannot capture videos or images of a spacecraft and/or astronauts from outside the spacecraft.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 is schematic view of a flight of a rocket and an autonomous deployable camera, according to some embodiments.

FIG. 2 is a schematic side view of an autonomous deployable camera, according to some embodiments.

FIG. 3 is a schematic internal view of an autonomous deployable camera, according to some embodiments.

FIG. 4 is a side view of a rocket-camera system during separation, according to some embodiments.

FIGS. 5A and 5B are side views of a scissor-type camera dispenser, according to some embodiments.

FIG. 6 is a flow diagram of telemetry from a deployable camera, according to some embodiments.

FIG. 7 is a flow diagram of a process of operating an autonomous deployable camera, according to some embodiments.

DETAILED DESCRIPTION

This disclosure describes systems and methods for, among other things, photography of a spacecraft during space flight. For example, an autonomous deployable camera (ADC) may capture images (e.g., including video) of a portion of a rocket, such as a crew capsule, as it flies in space with the Earth's horizon in the background and astronauts within the crew capsule visible and recognizable through windows of the crew capsule. In addition to being useful for analysis of the crew capsule, such photography may have commercial value. An aspect of autonomy of the ADC is that captured images need not be telemetered to the ground or crew capsule and instead may be recovered after the ADC lands, as described below. Another aspect of autonomy is that the ADC may land on the ground (e.g., of Earth) independent of landings or flight trajectories of the crew capsule or other parts of a rocket. For example, the captured images may be recovered after the ADC lands on the ground or water independently of the landings or flight trajectories of the crew capsule or other parts of a launch vehicle. The ADC may include a parachute to slow the descent of the ADC. The ADC may also include tracking hardware to allow the ADC to be relatively easily recovered (e.g., found) on the ground. After recovery, images may be downloaded from the ADC. Still another aspect of autonomy of the ADC is that captured images may be relayed through a component of the launch vehicle, through another launched element, or through an already-present relay station.

In some implementations, the positioning of the ADC relative to the crew capsule during flight above the Karman Line may be selected for providing optimal views of the crew capsule. For example, the "best" viewing of the crew capsule for capturing images or video may be when the ADC is about 0 to 10 feet above the base of the crew capsule. Also, the ADC being about 5 to 10 feet below the base of the crew capsule may be acceptable for radial distances greater than about 20 feet.

A benefit of the ADC is that it may capture images or video of the crew capsule and the Earth below. As mentioned above, the images or video may include features in a background that includes Earth and may include astronauts' faces in the windows of the crew capsule during a period of microgravity. The crew capsule may be part of a rocket system that includes a booster portion configured to lift the crew capsule into lower Earth orbit, such as above the Karman Line, for example. In some implementations, the ADC may be released (e.g., ejected) from the booster portion at or after booster/crew capsule separation. Following release, the ADC may be configured to maintain a near neutral vertical separation rate from the crew capsule through at least crew capsule (and ADC) apogee. In some implementations, the ADC may begin to capture images or video of the crew capsule immediately following booster/ crew capsule separation and such image/video capture may continue for at least the next 180 seconds. Of course, these figures are merely examples and claimed subject matter is not limited in this respect.

In some embodiments, a system may include an ADC, launched from a first portion of a spacecraft by a technique that allows the ADC to follow a second portion of the spacecraft along a trajectory that is common to both the second portion of the spacecraft and ADC. The ADC, travelling a path alongside the second portion of the spacecraft, allows for photography of the second portion of the spacecraft during microgravity coast phases of space flight. For example, photography may include images or video of a crew capsule (e.g., the second portion of the spacecraft) flying in space with Earth's horizon in the background and astronauts visible and recognizable in the windows of the crew capsule. Such photography may allow for producing commercially-valuable imagery that includes a background of an illuminated, curved Earth horizon, for example. Imagery may also involve, among other things, a unique microgravity environment. Such imagery may otherwise require artificial visual effects that may appear less realistic. Additionally, the novelty of capturing images during an actual space flight may itself be valuable.

In some embodiments, the ADC described above may be part of a rocket-camera system that includes a rocket and an ADC dispenser. In some implementations, as indicated above, the rocket may include a booster portion and a capsule portion, both of which are configured to separate during a separation stage of flight of the rocket. The ADC dispenser may be attached to the booster portion and may be configured to retain the ADC until the ADC dispenser ejects the ADC upon or after the separation stage. The ADC dispenser may be further configured to eject the ADC with a speed and a trajectory that are substantially equal to a speed and a trajectory of the capsule portion after the separation stage. Thus, for example, the ADC and the capsule portion may reach apogee at substantially the same time. The ADC may capture video or images of the capsule portion during apogee. Prior to apogee, the ADC may capture video or images of the capsule portion at an elevation at or above the Karman Line. After performing photography of the capsule portion, the ADC may be configured to land on Earth's surface using a parachute to slow its descent.

In some embodiments, an ADC may be deployed and operate in or beyond low-Earth orbit. For example, in some implementations, an ADC may be deployed from a satellite. In other implementations, an ADC may be deployed at the same time as a satellite is deployed from a spacecraft. For example, the ADC and the satellite may be deployed separately but substantially at the same time from the spacecraft.

An ADC deployed and operated in or beyond low-Earth orbit may be used to capture images or video of events such as separation of rocket stages, images or video of operation or deployment of satellites (e.g., solar panel configuration, antenna orientation, etc.), and images or video of external conditions (e.g., integrity, orientation, function, etc.) of spacecraft, just to name a few examples.

An ADC that is deployed beyond low-Earth orbit may be configured differently from ADCs that operate just above or below the Karman line, as described above. For example, an ADC for operation beyond low-Earth orbit may be designed as a disposable system, wherein the ADC is not expected to return to Earth or to the spacecraft from which it was deployed. Accordingly, the ADC need not include, for instance, a parachute or long-term memory to store photographic or video data. Instead, the ADC may include a transmitter to convey photographic or video data or various sensor data. In this context, such data is hereinafter called telemetry data. Generally, telemetry is the automatic measurement and wireless transmission of data from a remote source. In the presently-described embodiment, the remote source is the ADC, which may be configured to automatically measure various parameters and/or capture video/photos and wirelessly transmit the resulting data a spacecraft or other receiving entity, for example.

FIG. 1 is schematic view of a flight 102 of a rocket, which includes a crew capsule (space vehicle) 104 atop a propulsion module (booster rocket) 106, and an ADC 108, according to some embodiments. For example, flight 102 may be the same as or similar to flights of the New Shepard suborbital vehicle by Blue Origin. Claimed subject matter and embodiments described herein, however, are not so limited. Embodiments described herein may be applied to other suborbital vehicles as well as orbital vehicles that travel in high-Earth orbit and beyond.

Subsequent to preflight activities, which may include loading ADC 108 into an ADC dispenser 110, flight 102 may begin with liftoff of crew capsule 104 and propulsion module 106 at time 112. Some minutes later, after a time span 114, at time 116, crew capsule 104 separates from propulsion module 106. At or near time 116 (e.g., just prior to, during, or just after rocket portion separation), ADC dispenser 110 may eject ADC 108 so that the ADC has the same or similar speed and trajectory (e.g., velocity) as crew capsule 104, which continues to climb past the Karman line (100 kilometers, 330,000 feet above Earth's mean sea level), which is the internationally recognized boundary of space.

ADC 108 and crew capsule 104 both travel along a trajectory 118. Meanwhile, propulsion module 106 falls back to Earth 119, along a trajectory 120, in a booster reentry phase, eventually landing at time 122.

During a time span 124, crew capsule 104 and ADC 108 eventually reach apogee (e.g., their maximum distance from Earth), as indicated by arrow 125, during free-flight (e.g., sans rocket propulsion) in micro-gravity (hereinafter referred to by the approximation "zero-gravity"). Throughout time span 124, ADC 108 may continue to be within a relatively close distance from space vehicle 104. For example, this distance may be less than 5 or 6 meters, though claimed subject matter is not limited to this particular example. Both ADC 108 and crew capsule 104 may be in zero-gravity for several minutes before falling back toward Earth and out of zero-gravity. This several-minute period is herein called "free-flight," during which photography may be most desired. After this period, both ADC 108 and crew capsule 104 begin to fall toward Earth and begin to encounter atmospheric drag.

ADC 108 may have a ballistic coefficient (e.g., 0.6 lbm/in2) greater than that of crew capsule 104 to ensure that no in-flight contact can occur during reentry. ADC 108 may be configured to land before crew capsule 104 lands to also ensure no in-flight contact. In some implementations, ADC 108 having a ballistic coefficient greater than that of crew capsule 104, may follow a trajectory 126 that is substantially different from a trajectory 128 of the crew capsule. These two trajectories lead to an ever-increasing separation distance and help to prevent the possibility of a collision between the two objects. Flight 102 ends when crew capsule 104, travelling along trajectory 128, lands on Earth's surface 119 at time 130. ADC 108, travelling along trajectory 126, lands on Earth at time 132. Both crew capsule 104 and ADC 108 may use one or more parachutes 134 to slow their descent. A time span 136 may separate landing times of propulsion module 106 and ADC 108. A time span 138 may separate landing times of ADC 108 and space vehicle 104.

Crew capsule 104 may carry crew or passengers (collectively referred to as "astronauts"). In various implementations described herein, crew capsule 104 may be autonomously or remotely controlled so that only passengers are on board (e.g., no crew). Thus, flight 102 and crew capsule 104 may be configured for space tourism, rendering photography to be an important part of the flight mission.

FIG. 2 is a schematic side view of an ADC 202 and FIG. 3 is a schematic internal view of the ADC, according to some embodiments. ADC 202, which may be ejected from a propulsion module to follow a space vehicle (e.g., crew capsule), may be the same as or similar to ADC 108, for example. ADC 202 includes one or more windows 204 for lenses of a camera 302. ADC 202 may include a tapered portion 206 that may be configured to provide a particular ballistic coefficient for the ADC. For example, the ballistic coefficient may be adjusted to provide an amount of atmospheric drag needed to cause the ADC to have a descent trajectory that is different from that of the space vehicle. As mentioned above, the different descent trajectories prevent even the remote possibility of a collision between the ADC and the space vehicle during descent through the atmosphere.

ADC 202, which is configured to be reusable after deployment, may include control electronics 304, a parachute 306, and a tracking device 308. Camera 302 may be a 360-degree camera, which may have more than one lens (each with a corresponding window 204, for example) to capture images (or video) in all directions simultaneously. Control electronics 304 may include a clock or timer and various sensors, such as for measuring pressure, orientation, and acceleration, for example. Control electronics 304 may be configured to determine when ADC 202 is ejected from the propulsion module, in micro-gravity, at apogee, and/or below the Karman Line falling through the atmosphere. Accordingly, control electronics 304 may determine when to capture images or video, such as during apogee, for example. Control electronics 304 may also include electronic memory to store images and video that can be subsequently downloaded.

Referring to FIG. 1, parachute 306, which may be the same as or similar to 134, may be configured to deploy during freefall along trajectory 126. Tracking device 308 may be used to find ADC 202 after the ADC has landed on Earth. Images and video captured by the ADC may be recoverable following landing of the ADC.

FIG. 4 is a side view of a rocket-camera system 400 during separation, according to some embodiments. Rocket-camera system may include a rocket having a booster portion 402 and a capsule portion 404, both of which are configured to separate during a separation stage of flight of the rocket. The system may also include an ADC dispenser 406. The ADC dispenser may be attached to a section 408 of the booster portion that interfaces with capsule portion 404 before separation. In other embodiments, however, the ADC dispenser may be attached to capsule portion 404, and claimed subject matter is not limited to any particular location of an ADC dispenser. ADC dispenser 406 may be configured to retain an ADC 410 until the ADC dispenser ejects the ADC upon or after the separation stage. In some implementations, ADC dispenser 406 ejects the ADC upon or after detecting the separation stage by using an accelerometer to detect a change in acceleration corresponding to separation. In other implementations, ADC dispenser 406 may detect the separation stage by using a laser rangefinder to sense the distance of separation between booster portion 402 and capsule portion 404. In still other implementations, ADC dispenser 406 may detect the separation stage by receiving a separation command signal from electronics on board booster portion 402. In still other implementations, ADC dispenser 406 may eject the ADC passively, wherein ejection occurs as a result of the physical separation of the capsule portion from the booster portion affecting compression or rotation of the ADC dispenser, as described below.

In some embodiments, ADC 410 may be off until it is turned on using a signal such as the separation command signal mentioned above. For example, the ADC may include a USB C port that may receive an electrical signal indicating separation between the booster and the crew capsule. In other embodiments, a magnetic or contact switch may be used to turn on and initiate image capture of video recording. For example, the magnetic or contact switch may open from a closed position (or vice versa) when ADC dispenser 406 ejects the ADC. The ADC dispenser may further be configured to eject the ADC with a speed and a trajectory that are substantially equal to a speed and trajectory of the capsule portion after the separation stage.

FIG. 5A is a side view of a scissor-type ADC dispenser 502 in a compressed readied-state and FIG. 5B illustrates the scissor-type ADC dispenser in an extended state subsequent to ejection of an ADC 504, according to some embodiments. Though an example dispenser is described herein, claimed subject matter is not limited to any type or method of dispensing an ADC. For instance, an ADC may be dispensed by merely releasing the ADC (e.g., by opening clips or latches) from a rocket stage.

Dispenser 502 includes a holder 506 configured to securely hold the ADC until ejection. An anchor portion 508 is configured to attach to a portion of a rocket, such as section 408 of booster portion 402, for example. In FIG. 5A, springs (not illustrated) are in tension and apply forces to elements 510. In FIG. 5B, these spring forces act to extend ADC dispenser 502 in a direction indicated by arrow 512. This extension is relatively fast and acts to eject the contents of holder 506, which is ADC 504, up to 24 inches per second in some examples. In particular, ADC dispenser 502 may be configured to eject ADC 504 with a speed and a trajectory that are substantially equal to a speed and trajectory of a capsule portion of the rocket after the separation stage. In some implementations, scissor-type ADC dispenser 502 may be held in a compressed readied-state by an aft portion of the crew cabin prior to its separation from booster portion 402. Upon separation, the extendable portion of dispenser 502 and holder 506 follow the motion of the crew capsule aft surface to provide direct delivery of the ADC.

ADC dispenser 502 may be configured to eject an ADC having a weight of about 50 pounds, though claimed subject matter is not so limited. In some implementations, ADC dispenser 502 may or may not impart a rotation, indicated by arrow 514, to ADC 504 upon ejection.

FIG. 6 is a flow diagram of telemetry from an ADC 602, according to some embodiments. For example, ADC 602 may be deployed and operate in or beyond low-Earth orbit. In some implementations, ADC 602 may be deployed from a satellite, illustrated as "spacecraft A" in the figure. In other implementations, ADC 602 may be deployed at the same time as a satellite is deployed from a spacecraft, illustrated as "spacecraft B" in the figure. For example, ADC 602 and the satellite may be deployed separately but substantially at the same time from the spacecraft. In other implementations, ADC 602 may be deployed just before, during, or just after separation between stages of a rocket in or beyond low-Earth orbit.

ADC 602 may be configured differently from ADC 108 or 202, for example, which operate just above or below the Karman line, as described above. In contrast to ADCs 108 or 202, ADC 602 may be designed as a disposable system in that ADC 602 does not return to Earth or to the spacecraft from which it was deployed. Accordingly, ADC 602 may include a transmitter to transmit photographic or video data or various sensor data (e.g., proximity or orientation data). ADC 602 may transmit this telemetry data to one or more particular receivers. In one implementation, ADC 602 may transmit the telemetry data in a path 604 to spacecraft A, from which the ADC was deployed. As mentioned above, spacecraft A may be a satellite, for example, which may deploy ADC 602 with a trajectory that maintains the ADC in close proximity to the satellite for a relatively long time (e.g., minutes or hours) as the two craft drift increasingly far apart. Thus, due to a relative proximity, the satellite (spacecraft A) may easily receive telemetry data transmitted by ADC 602. In another implementation, ADC 602 may transmit the telemetry data in a path 606 to spacecraft B, which may be a spacecraft that deployed both the ADC and spacecraft A. Path 606 may be relatively short during a time span subsequent to such deployment. Accordingly, spacecraft B may easily receive telemetry data transmitted by ADC 602. On the other hand, if path 606 is relatively long, then telemetry data transmitted by ADC 602 may follow paths 604 and 608, wherein spacecraft A may include a relatively strong transmitter. In some implementations, spacecraft A and spacecraft B may relay telemetry data from ADS 602 to a base station 610 on Earth, the Moon, or Mars, for example, along paths 612 and 614, respectively.

FIG. 7 is a flow diagram of a process 700 of operating an ADC, according to some embodiments. For example, the process may be performed by an operator such as a crew member, an electronic controller, a computer processing system following computer-executable instructions, or a combination thereof. The operator may initiate a separation between a first portion of a rocket and a second portion of the rocket. For example, the first portion of the rocket may be a rocket booster and the second portion may be a crew capsule. At 704, the operator may, prior to, during, or subsequent to the separation, allow for ejecting the ADC from an ADC dispenser attached to the first portion of the rocket. The ejecting may impart to the ADC a speed and a trajectory that are substantially equal to a speed and trajectory of the first or second portion of the rocket. At 706, while the ADC travels relatively near to that portion of the rocket, the operator may use the ADC to capture video or images of that portion of the rocket. For example, the operator may use the ADC to capture video or images of the separating element (e.g., from a rocket) and the separated element or elements of the rocket or launch vehicle.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

I claim as follows:

1. A method of operating a camera of a rocket system that includes a booster portion and a capsule portion, the method comprising:

prior to, upon, or after separation between the booster portion and the capsule portion, ejecting the camera from a camera dispenser attached to the booster portion, wherein the ejecting imparts to the camera a speed and a trajectory that are substantially equal to a speed and trajectory of the capsule portion; and operating the camera to capture video or images of the capsule portion.

2. The method of claim 1, wherein operating the camera to capture video or images of the capsule portion is performed at an elevation at or above the Karman Line.

3. The method of claim 1, wherein the camera and the capsule portion reach apogee at substantially the same time.

4. The method of claim 3, wherein operating the camera to capture video or images of the capsule portion is performed during the apogee.

5. The method of claim 1, further comprising, after operating the camera to capture video or images of the capsule portion, retrieving the camera from Earth's surface.

6. The method of claim 1, wherein, after the ejecting, a separation between the camera and the capsule portion continuously increases during flight.

7. The method of claim 1, wherein the ejecting imparts to the camera no rotational motion.

8. The method of claim 1, wherein the camera is a 360-degree camera.

9. A rocket-camera system, the system comprising:

a rocket including a booster portion and a capsule portion, the booster portion and the capsule portion configured to separate during a separation stage of flight of the rocket; and a camera dispenser attached to the booster portion and configured to retain a camera until the camera dispenser ejects the camera upon or after the separation stage.

10. The rocket-camera system of claim 9, wherein the camera dispenser is con-figured to eject the camera with a speed and a trajectory that are substantially equal to a speed and trajectory of either the capsule or booster portion after the separation stage.

11. The rocket-camera system of claim 9, wherein the camera is configured to capture video or images of the capsule portion at an elevation at or above the Karman Line.

12. The rocket-camera system of claim 9, wherein the camera and the capsule portion are configured to reach apogee at substantially the same time.

13. The rocket-camera system of claim 12, wherein the camera is configured to capture video or images of the capsule or booster portion during the apogee.

14. The rocket-camera system of claim 9, wherein the camera is configured to land on Earth's surface subsequent to being ejected from the camera dispenser.

15. A method of operating a rocket-camera system, the method comprising:

prior to, during, or subsequent to a separation between a first portion and a second portion of a rocket, ejecting a camera from a camera dispenser attached to the first portion of the rocket, wherein the ejecting imparts to the camera a speed and a trajectory that are substantially equal to a speed and trajectory of the first portion or the second portion of the rocket; and using the camera to capture video or images of the first portion or the second portion of the rocket.

16. The method of claim 15, wherein operating the camera to capture video or images of the first portion or the second portion of the rocket includes being performed at an elevation at or above the Karman Line.

17. The method of claim 15, wherein the camera and the first portion or the second portion of the rocket reach apogee at substantially the same time.

18. The method of claim 17, wherein operating the camera to capture video or images of the first portion or the second portion of the rocket is performed during the apogee.

19. The method of claim 15, wherein, after the ejecting, a separation between the camera and the first and the second portions of the rocket continuously increases during flight.

20. The method of claim 15, wherein the ejecting imparts to the camera no rotational motion.

* * * * *